Figure 1:
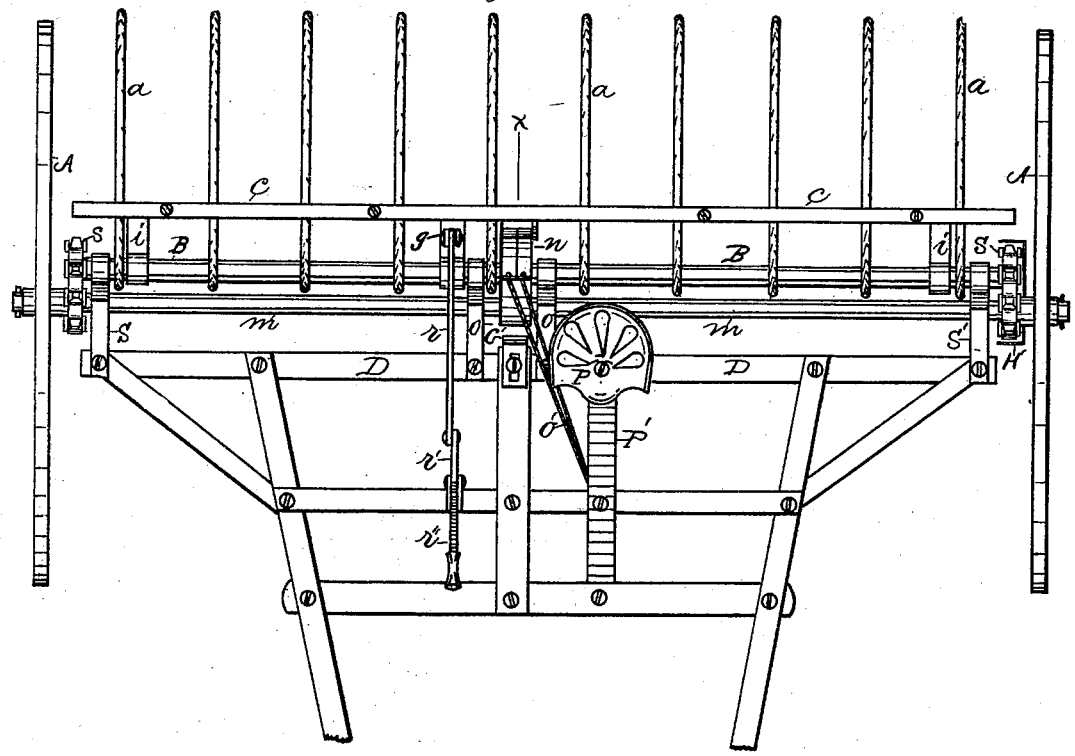

(No Model.) 2 Sheets—Sheet 1.

T. C. LORD.
HORSE HAY RAKE.

No. 268,111. Patented Nov. 28, 1882.

Witnesses

Thos. H. Hutchins
Wm. J. Hutchins

Inventor
Tyler C. Lord (No Model.) 2 Sheets—Sheet 2.
T. C. LORD.
HORSE HAY RAKE.
No. 268,111. Patented Nov. 28, 1882.
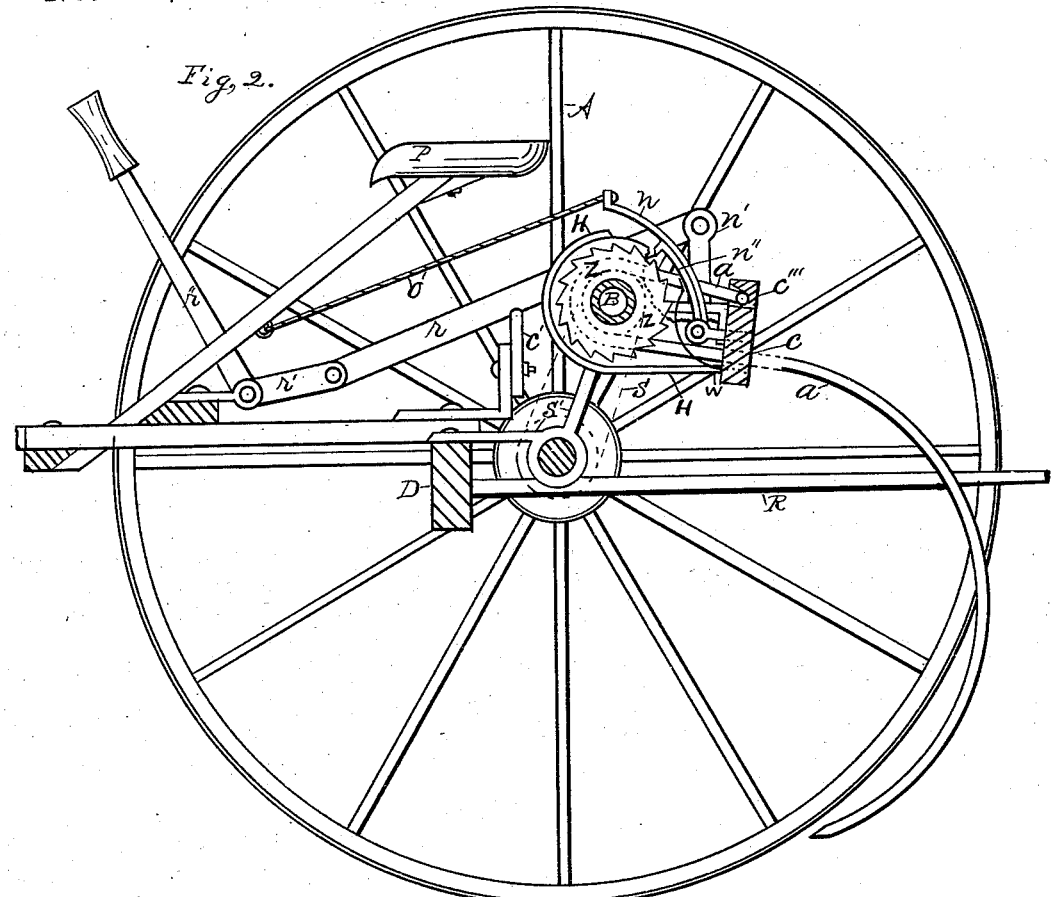
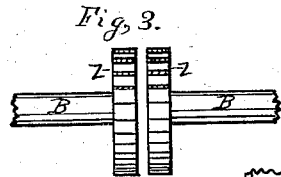
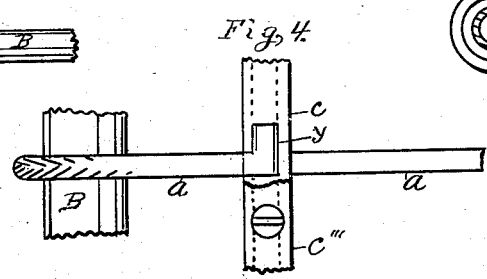
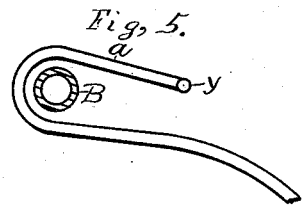
Witnesses.
Thos. H. Hutchins
Wm. J. Hutchins
Inventor.
Tyler C. Lord

UNITED STATES PATENT OFFICE.

TYLER C. LORD, OF JOLIET, ILLINOIS, ASSIGNOR OF ONE-HALF TO FRANK E. MARSH, OF SAME PLACE.

HORSE HAY-RAKE.

SPECIFICATION forming part of Letters Patent No. 268,111, dated November 28, 1882.

Application filed January 13, 1882. (No model.)

*To all whom it may concern:*

Be it known that I, TYLER C. LORD, of the city of Joliet, in Will county, and State of Illinois, have invented certain new and useful Improvements in Horse Hay-Rakes, the construction and operation of which I will proceed to explain, reference being had to the annexed drawings, making a part of this specification, in which—
Figure 1 is a plan view; Fig. 2, a vertical cross-sectional view on the line $x$ in Fig. 1; Fig. 3, a front elevation of the two ratchet-wheels $z$ on the continuously-revolving rake-head; Fig. 4, a plan view on the top of a tooth and the lifting-bar, showing the attachment of the tooth to said lifting-bar; and Fig. 5, a side view of the upper end of a tooth, showing its relation to the rake-head.

This invention relates to certain improvements in horse hay-rakes such as are in ordinary use; and it consists principally in the construction of the rake-head and the devices for operating the lifting of the teeth to discharge their load, as particularly pointed out in the claims.

Referring to the drawings, A are the two traveling wheels, that support the machine and rotate on the axle $m$, which consists simply of a straight loose rod. The arms S' rest upon the axle $m$ and support at their front end the stripper-bar D and a pair of ordinary shafts, girths, seat-board, &c., which I do not further describe, as they do not form any part of this invention. The rear end of the arms S' are formed into boxes that receive and support the outer ends of the continuously-revolving divided rake-head B, while the inner ends of the said rake-head are supported and revolve in the boxes on the rear ends of the arms $o$ near the central part of the machine, as shown in Fig. 1. The inner ends of the hubs of the wheels A are formed in the shape of sprocket-wheels, and also so are the outer ends of the revolving divided rake-head B, as shown in said Fig. 1, and the endless chains S connect the two so that the revolving rake-heads B are driven by the hubs of the wheels A by means of the endless chains S and rotate continuously in the direction the machine travels.

Each part of the revolving rake-head B is separate from the other, so that as the machine travels out of a straight line the speed of the two parts of the rake-head may vary, or may rotate in opposite directions without injury to the parts or each other to permit the machine to be turned around or backward. The inner ends of the two parts of the rake-head B approach each other very closely near the center of the machine, and each is furnished with a rigidly-fixed ratchet-wheel, $z$, (shown more particularly in Figs. 2 and 3,) which of necessity rotate with and in the same direction as the revolving rake-head B. Immediately in the rear of the said ratchets $z$ is located a pawl for each ratchet, which pawl $n$ stands hinged to the lifting-bar $c$ at its front. A spring, $w$, stands under the pawls $n$ and supports them both at once in an upright position, so as to be free from contact with the ratchets $z$, as shown in Fig. 2, until it is desired to bring them in contact.

When the operator desires to raise the teeth $a$ to discharge their load he bears down with his foot on the cord $o'$, which pulls the upper end of the pawls $n$ forward, causing the catch $n''$ on the under side of the pawls $n$ to engage with the teeth of the ratchets $z$ as they rotate, which elevates the lifting-bar $c$, with the teeth $a$, which pass through it, carrying it upward and forward until the pawls $n$ are carried forward far enough to engage with the adjustable stop $c'$ immediately in front of the ratchets $z$, causing the catch $n''$ of the pawls $n$ to disengage with the ratchets, while the spring $w$ holds the pawls $n$ up in their original position after the foot is off the cord $o'$, and lets the rake-teeth $a$ fall to the ground to gather up another load. The pawls $n$ and ratchets $z$ are separated, so that either one will elevate the lifting-bar, as set forth, independently of the other, so that the teeth $a$ may be elevated even while the rake is being turned about, as the outer traveling wheel will rotate one part of the rake-head and ratchets, and perform the operation of lifting the rake-teeth, as described.

The stop $c'$ is attached to the machine in such a manner that it may be adjusted up or down to engage with the pawls $n$ sooner or later, so as to regulate the height to which the teeth $a$ are elevated from the ground. The upper end of the teeth $a$ are formed in the shape shown in Fig. 4, in the shape of an L, and lie in a corresponding recess in the cap $c'''$ of the lifting-bar, as is also shown in Fig. 2.

The cap $c'''$ is attached to the top of the lifting-bar $c$ by means of bolts or screws, as shown in Fig. 4, after the teeth are all placed in their respective places between them, and this is the only fastening to the machine the teeth $a$ have. The teeth bend around the revolving rake-head B loosely, as is shown in Fig. 5, to allow the "drop" or play up and down of the teeth as they travel along, and then return through the tooth-board $c$ through a separate aperture of just the diameter of the tooth after leaving the rake-head. When it is desired to hold the teeth up off the ground to travel from one field to another, so as not to rake, the levers $r$, $r'$, and $r''$ are used. The lever $r$ attaches to the standard $n'$ on the arm $g$, Fig. 1, which arm $g$ is hinged to the rake-head B and bolted to the lifting-bar $c$, so that when the lever $r''$ is pulled toward the seat it will elevate the rake-teeth $a$ and lifting-bar $c$ for said purpose. The stripper-bar D is arranged on the under side of the machine in front of the axle $m$, and bears the stripping-teeth R in the ordinary manner. The ratchet-wheels $z$ are inclosed in hoods H to prevent them from being clogged by hay or other obstruction. Similar hoods, H', are arranged to cover and protect the endless chains S.

Having thus described my invention, what I claim as new, and desire to secure by Letters Patent, is as follows, to wit:

1. In a horse hay-rake, the rake-head B, constructed in two equal parts and supported on the axle $m$ by the arms S' and $o$, and arranged to revolve continuously independently of each other by means of the endless chains S, and provided on their inner ends with the ratchets $z$ and pawls $n$ to elevate the tooth-board $c$, containing the teeth $a$, in the manner set forth.

2. In a horse hay-rake, the teeth $a$, hinged in the tooth-board $c$, as shown, and arranged to inclose the rake-head B loosely and return through a separate aperture having a diameter coextensive with that of the tooth in the tooth-board, whereby the portion of the teeth inclosing the rake-head B is free to oscillate up and down by reason of such loose inclosure, as set forth.

TYLER C. LORD.

Witnesses:
   THOS. H. HUTCHINS,
   WM. J. HUTCHINS.